(12) United States Patent
Beckwith et al.

(10) Patent No.: US 11,804,968 B2
(45) Date of Patent: Oct. 31, 2023

(54) AREA EFFICIENT ARCHITECTURE FOR LATTICE BASED KEY ENCAPSULATION AND DIGITAL SIGNATURE GENERATION

(71) Applicant: PQSECURE TECHNOLOGIES, LLC, Boca Raton, FL (US)

(72) Inventors: Luke Beckwith, Sterling, VA (US); Mojtaba Bisheh Niasar, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/779,051

(22) PCT Filed: Sep. 30, 2021

(86) PCT No.: PCT/US2021/052905
§ 371 (c)(1),
(2) Date: May 23, 2022

(87) PCT Pub. No.: WO2023/055377
PCT Pub. Date: Apr. 6, 2023

(65) Prior Publication Data
US 2023/0126984 A1    Apr. 27, 2023

(51) Int. Cl.
*H04L 9/32* (2006.01)
*H04L 9/30* (2006.01)

(52) U.S. Cl.
CPC .......... *H04L 9/3252* (2013.01); *H04L 9/3093* (2013.01)

(58) Field of Classification Search
CPC ............................ H04L 9/3252; H04L 9/3093
See application file for complete search history.

(56) References Cited

U.S. PATENT DOCUMENTS

2009/0136022 A1* 5/2009 Langendoerfer ..... G06F 7/5324
                                                                          708/232
2019/0312728 A1* 10/2019 Poeppelmann ....... H04L 9/3093
(Continued)

OTHER PUBLICATIONS

Alkim et al. Cortex-M4 optimization for [R, M] LWE schemes, IACR Transactions on Cryptographic Hardware and Embedded Systems, 2020, pp. 336-357 [online], [retrieved on Nov. 29, 2021]. Retrieved from the internet.
(Continued)

*Primary Examiner* — J. Brant Murphy
(74) *Attorney, Agent, or Firm* — Mark C. Johnson; Johnson Dalal (57) ABSTRACT

An area efficient architecture for lattice based key encapsulation and digital signature generation having a co-processor with a polynomial arithmetic submodule configured to process polynomial arithmetic and generate integer values representing polynomial coefficients, a hash submodule operably configured to perform hash operations and to generate pseudorandom numbers, a polynomial format submodule communicatively coupled to the polynomial arithmetic submodule and the hash submodule and operably configured to encode polynomials and decode polynomials, a memory bank communicatively coupled with and operably configured to receive and store temporary values from the polynomial arithmetic submodule, the hash submodule, the polynomial format submodule, and a data interface, and with a control unit operably configured to manage the data interface at selectively controlled time intervals and to utilize the polynomial arithmetic submodule, the hash submodule, and the polynomial format submodule to perform the plurality of cryptographic algorithms for Dilithium-DSA and for Kyber-KEM with the temporary values.

5 Claims, 10 Drawing Sheets

(56) References Cited

U.S. PATENT DOCUMENTS

| | | | |
|---|---|---|---|
| 2020/0082738 A1* | 3/2020 | Poeppelmann | H04L 9/002 |
| 2020/0265167 A1* | 8/2020 | Banerjee | G06F 21/72 |
| 2020/0313886 A1* | 10/2020 | Poeppelmann | H04L 9/3236 |
| 2021/0359868 A1* | 11/2021 | Poeppelmann | H04L 9/3271 |
| 2022/0006611 A1* | 1/2022 | Ghosh | G06F 7/72 |
| 2022/0006630 A1* | 1/2022 | Ghosh | H04L 9/0869 |
| 2022/0012334 A1* | 1/2022 | Ghosh | H04L 9/3247 |
| 2022/0014363 A1* | 1/2022 | Basso | H04L 9/3247 |
| 2023/0254115 A1* | 8/2023 | Hamburg | G06F 7/5443 380/28 |

OTHER PUBLICATIONS

Roy et al. High-speed instructions-set coprocessor for lattice-based key encapsulations mechanism; Saber in hardware, IACR Transactions on Cryptographic Hardware and Embedded Systems, 2020, pp. 443-466 [online], [retrieved on Nov. 29, 2021]. Retrieved from the internet.

* cited by examiner

AREA EFFICIENT ARCHITECTURE FOR LATTICE BASED KEY ENCAPSULATION AND DIGITAL SIGNATURE GENERATION

FIELD OF THE INVENTION

This disclosure relates to cryptographic algorithms and in particular to the Cryptographic Suite for Algebraic Lattices (CRYSTALS) cryptographic primitives Kyber and Dilithium.

BACKGROUND OF THE INVENTION

Cryptography refers to the field of mathematics concerning the use of algorithms to secure information and communication over unsecure networks. There are two primary types of cryptographic systems: symmetric algorithms which utilize a single secret key and asymmetric which utilize a public key and secret key pair. Secret key algorithms are generally useful for efficient encryption of data but require a method of establishing a shared secret key. Among others, two applications of asymmetric algorithms are key establishment and message verification. The CRYSTALS cryptographic primitives are a set of algorithms which provide these two cryptographic services. In particular, the algorithms of Kyber-KEM enable key encapsulation to establish shared secret values and the algorithms of Dilithium-DSA provide message verification through the use of digital signatures.

Key encapsulation involves three operations: (1) key generation wherein a public and secret key pair is generated, (2) encapsulation where in a ciphertext is generated using a provided secret value combined with the public key, and (3) decapsulation wherein the secret key is combined with the ciphertext to recreate said secret value.

Digital signature systems involve three operations: (1) key generation wherein a public and secret key pair is generated, (2) signature generation wherein a cryptographic signature is generated as a function of the secret key and message, and (3) signature verification wherein message integrity and identity of the sender are verified using the message, signature, and public key.

The primitives of the CRYSTALS algorithms provide these six functionalities utilizing polynomial arithmetic over algebraic lattices. These algorithms are under consideration for standardization by NIST under the Post Quantum Cryptographic (PQC) competition.

In one known device and method for performing the plurality of Kyber-KEM, a set of two butterflies is utilized to perform a plurality of operations required for polynomial arithmetic. However, this known device and method fail to provide an efficient area footprint because both butterflies must be used in conjunction with one another to perform Karatsuba multiplication which is essential for efficient performance. Said architecture also lacks a plurality of modules and operations required to perform the operations required for the plurality of algorithms in Dilithium-DSA.

In another known device and method for performing the plurality of Dilithium-DSA, an architecture for the algorithms of Dilithium-DSA is described, but does not support all possible security levels within a singular architecture. Said device and method utilizes separate NTT and matrix multiplication modules which unnecessarily increase the footprint of the design. Said device and method also lacks support for the plurality of operations required to perform the plurality of algorithms in Kyber-KEM.

In another known device and method, a general purpose coprocessor is described for performing a subset of operations for a variety of lattice-based protocols. Said architecture performs certain operations for Kyber-KEM and Dilithium-DSA, however it is targeted for general purpose and thus is not area efficient. Additionally, it lacks the ability to perform certain operations required for both Kyber-KEM and Dilithium-DSA and lacks a specialize control unit causing it to have poor performance for the area it consumes.

Lightweight processers benefit greatly from the offloading of key encapsulation and digital signature algorithms to area efficient coprocessors. However, existing works feature detrimental increases in resources or are too inefficient to be practical. Additionally, existing works do not efficiently share hardware modules for both Kyber-KEM and Dilithium-DSA. Thus, a need for an area efficient coprocessor implementing both Kyber-KEM and Dilithium-DSA exists.

Therefore, a need exists to overcome the problems with the prior art as discussed above.

SUMMARY OF THE INVENTION

The algorithms utilized by the primitives of CRYSTALS are useful for securing communication of lightweight microprocessors such as Internet of Things (IoT) devices against classical and quantum computer cryptanalysis. However, these algorithms require complex mathematical operations which consume substantial power and processor time. As such it is useful to offload the operations to a specialized coprocessor. While substantial performance improvements are easily achievable through the use of a specialize coprocessor, it is also beneficial to limit the footprint of the coprocessor so as to not excessively increase the resource utilization of the entire system.

The invention described in this document provides a specialized coprocessor for the six cryptographic algorithms required for the primitives of CRYSTALS. Said coprocessor also provides run-time configuration for the security level of the operation to accommodate varying security needs. The spirit of the invention is to provide substantial performance and power usage improvements over software implementations of CRYSTALS primitives while remaining a low footprint design which does not require excessive resources.

The invention provides an area efficient architecture for lattice-based key encapsulation and digital signature generation implemented as a co-processor on an electronic computing device and operably configured to perform a plurality of cryptographic algorithms for Dilithium-DSA at all defined post-quantum cryptography security levels and a plurality of cryptographic algorithms for Kyber-KEM at all defined post-quantum cryptography security levels that overcomes the hereinafore-mentioned disadvantages of the heretofore-known devices and methods of this general type.

With the foregoing and other objects in view, there is provided, in accordance with the invention, a hardware architecture having a co-processor with a polynomial arithmetic submodule operably configured to process polynomial arithmetic and generate integer values representing polynomial coefficients, with a hash submodule operably configured to perform hash operations and to generate pseudorandom numbers, a polynomial format submodule communicatively coupled to the polynomial arithmetic submodule and the hash submodule and operably configured to encode polynomials and decode polynomials, with a memory bank communicatively coupled with and operably configured to receive and store temporary values from the polynomial arithmetic submodule, the hash submodule, the polynomial format submodule, and a data interface, and with a control unit operably configured to manage the data interface at selectively controlled time intervals and to utilize the polynomial arithmetic submodule, the hash submodule, and the polynomial format submodule to perform the plurality of cryptographic algorithms for Dilithium-DSA and for Kyber-KEM with the temporary values.

In accordance with another feature, an embodiment of the present invention includes the polynomial arithmetic submodule having a singular butterfly unit operably configured to perform Karatsuba multiplication and accumulation, modular addition with optional compression, modular subtraction with optional compression, modular multiplication, a Cooley-Tukey butterfly operation, and a Gentlemen-Sande butterfly, to facilitate generating the integer values representing polynomial coefficients.

In accordance with another feature, an embodiment of the present invention also includes the polynomial arithmetic submodule having a singular integer multiplier unit operably configured to process the integer values representing polynomial coefficients for all operations utilizing modular multiplication, decomposition, and compression.

In accordance with a further feature, an embodiment of the present invention also includes the polynomial format submodule with a single shift register operably configured to be utilized by a coefficient sampling unit, a decompression unit, a hint unpacking unit, and a deserialization unit for decoding polynomials.

In accordance with yet another feature, an embodiment of the present invention also includes the coefficient sampling unit having a centered binomial sampling unit, a rejection sampling unit, and a uniform sampling unit.

In accordance with yet another feature, an embodiment of the present invention also includes the polynomial format submodule operably configured to unidirectionally communicate with the polynomial arithmetic submodule, the hash submodule, and the memory bank and bidirectionally communicate with the data interface.

Although the invention is illustrated and described herein as embodied in an area efficient architecture for lattice-based key encapsulation and digital signature generation implemented as a co-processor on an electronic computing device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

DETAILED DESCRIPTION

The present invention provides a novel hardware architecture for computation of the algorithms for the CRYSTALS primitives Kyber-KEM and Dilithium-DSA. The present invention provides a compact datapath architecture for efficiently sampling polynomials using various submodules depicted in FIG. 1. The architecture is operably configured to beneficially perform polynomial arithmetic using a read only memory (ROM) 112 and a specialized controller 113, which efficiently utilizes said datapath architecture to perform all operations required for the algorithms of Kyber-KEM and Dilithium-DSA utilizing a control flow such as those shown in FIGS. 4-9 and a memory storage bank 110 ("MEM BANK"). The memory storage bank 110 is operably configured to efficiently pack intermediate values required for said algorithms. Said controller 113 also manages the data interface 116 by enabling reading from the interface 116 at certain stages of operation and writing to the interface 116 at certain stages of operation. The security level of the algorithm being performed may be adjusted at runtime by the specialized controller 113, which is capable at performing the required operations at all defined security level including the NIST-recommended post-quantum cryptography security levels. The present invention provides a practical tradeoff between resources consumed and performance that is well-suited to act as a coprocessor for embedded devices.

Figure 1:
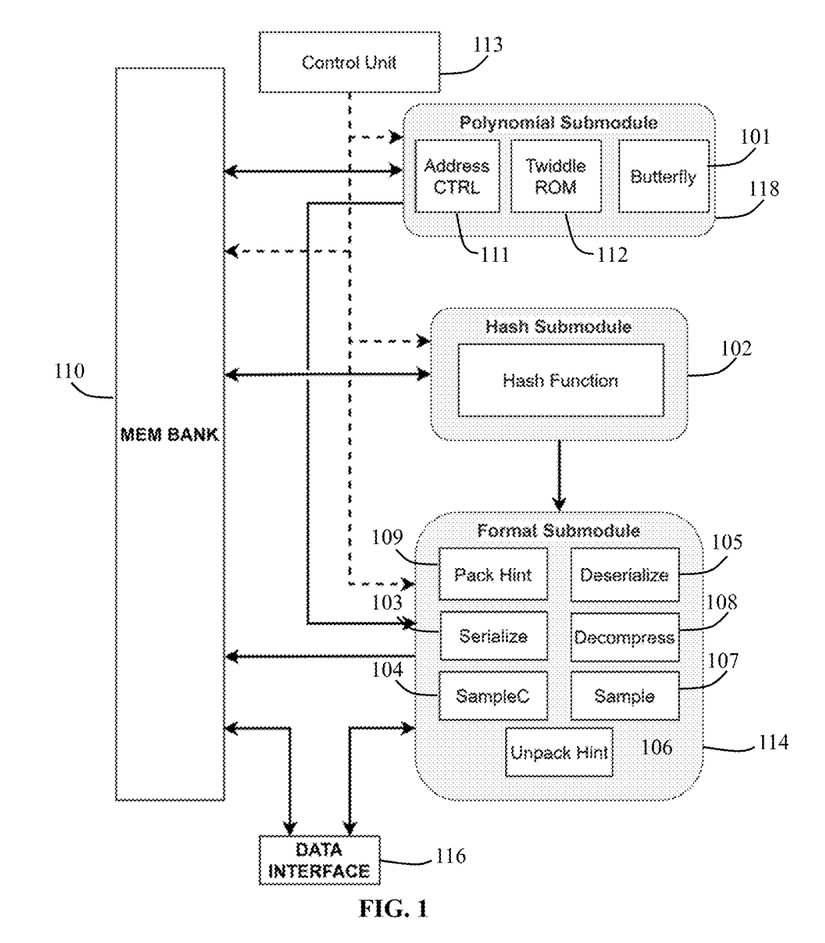
FIG. 1 is a block diagram of an exemplary architecture implementing the CRYSTALS primitives in accordance with one embodiment of the present invention.
Figure 2:
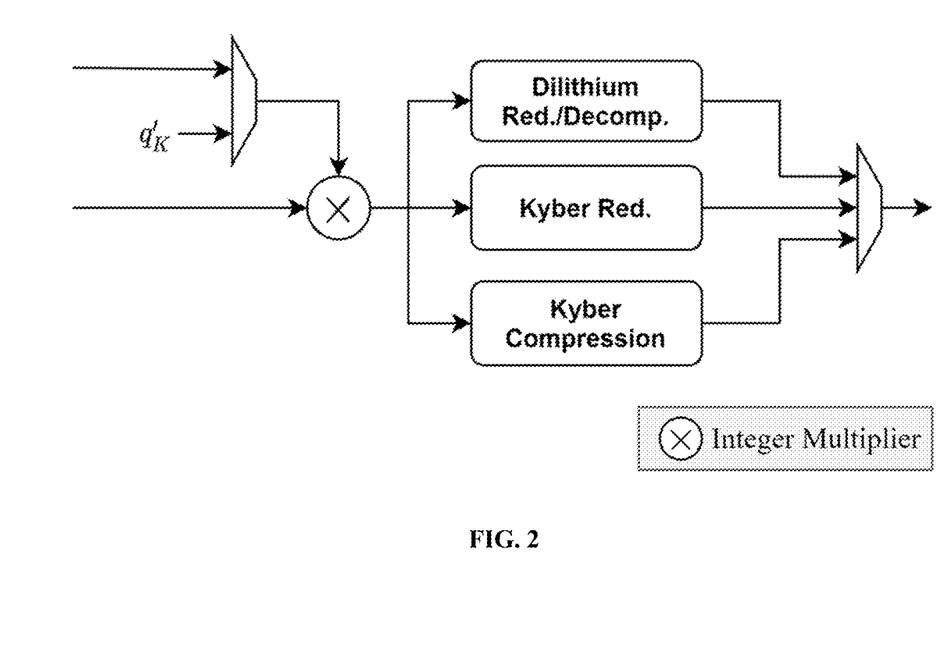
FIG. 2 is a block diagram of an architecture implementing modular multiplication and compression with a shared multiplier in accordance with one embodiment of the present invention.

FIG. 1 is a block diagram of a system which embodies the datapath for a compact architecture implementing both the Kyber-KEM and Dilithium-DSA primitives. Said architecture may beneficially include a compact butterfly unit 101. Said butterfly unit 101 is an instance of a module capable of performing Karatsuba multiplication and accumulation, modular addition with optional compression, modular subtraction with optional compression, modular multiplication, the Cooley-Tukey butterfly operation, and the Gentlemen-Sande butterfly operation as required for both the Kyber-KEM and Dilithium-DSA primitives. A singular multiplier may be beneficially utilized for modular multiplication and compression. With reference to FIG. 2, an instance of a module is shown utilizing a singular multiplier that is shared by both the modular multiplier and the compression unit to reduce resources required for these operations. During operation, data may flow from the memory bank 110 to the polynomial submodule 118, namely the butterfly module 101, to complete the appropriate mathematical operations. The result of the operation may be optionally stored back in the memory bank 110 as a temporary result or may be packed as a result by the serialize submodule 103 and/or the pack hint submodule 109. The range of memory locations accessible by the twiddle ROM 112 submodule is preferably determined by the specialized controller 113, but the individual addresses accessed is controlled by the internal address controller 111.

Figure 3:
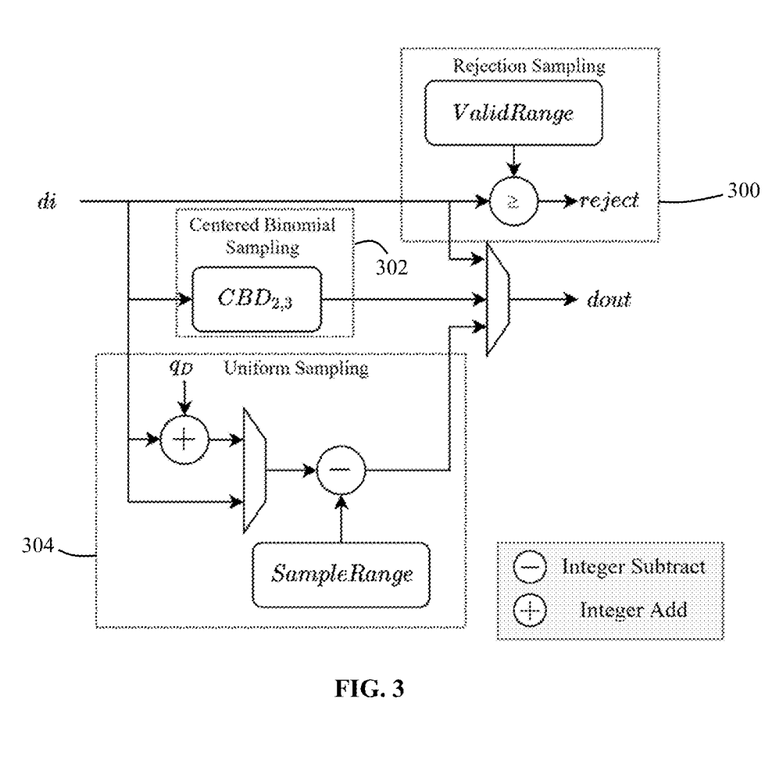
FIG. 3 is a block diagram of a module capable of performing all sampling required in the CRYSTAS primitives in accordance with one embodiment of the present invention.
Figure 4:
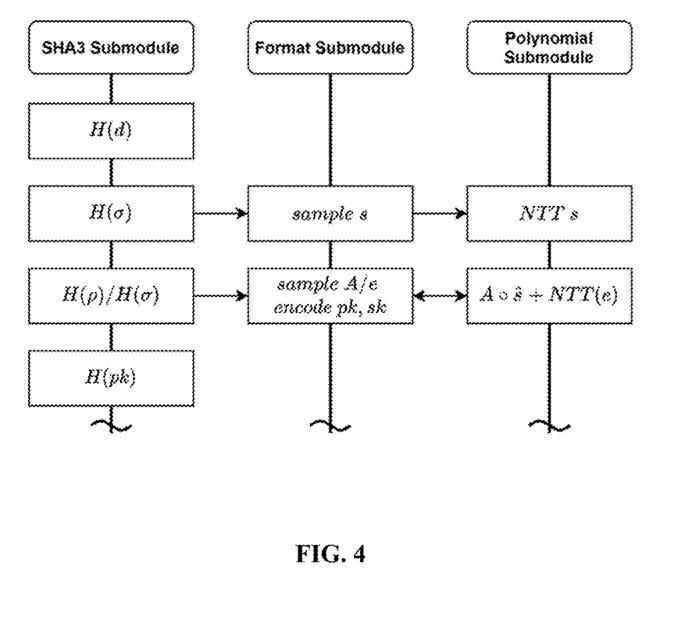
FIGS. 4-9 are flow diagrams showing one example of the algorithms of the Kyber-KEM and Dilithium-DSA primitives in accordance with one embodiment of the present invention.
Figure 5:
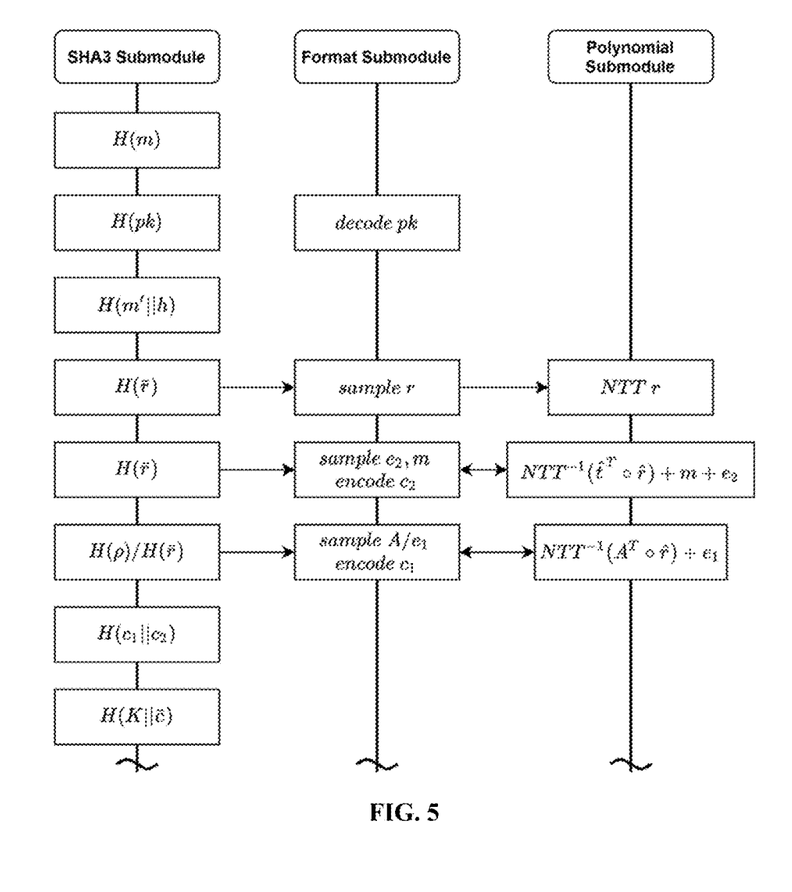
Figure 6:
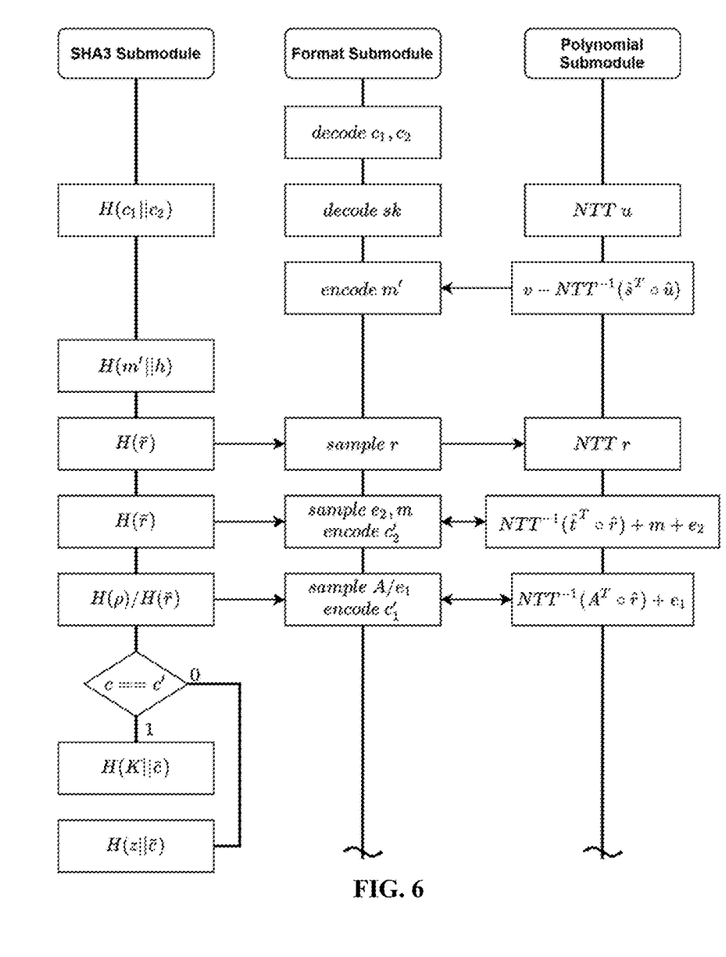
Figure 7:
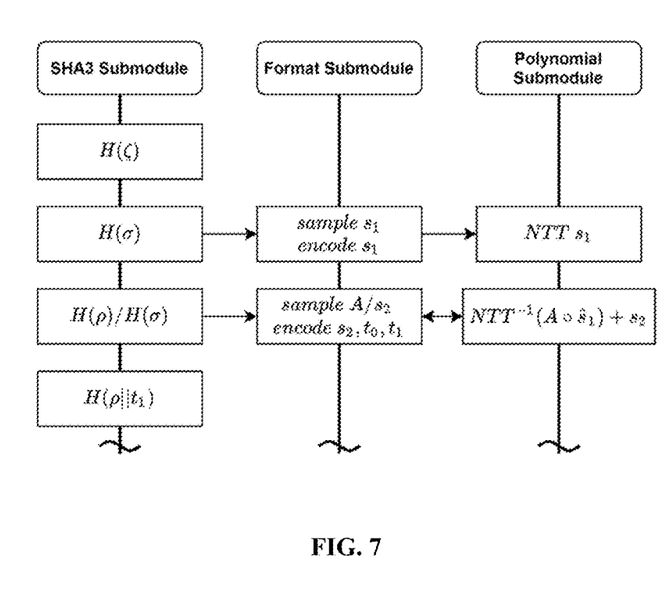
Figure 8:
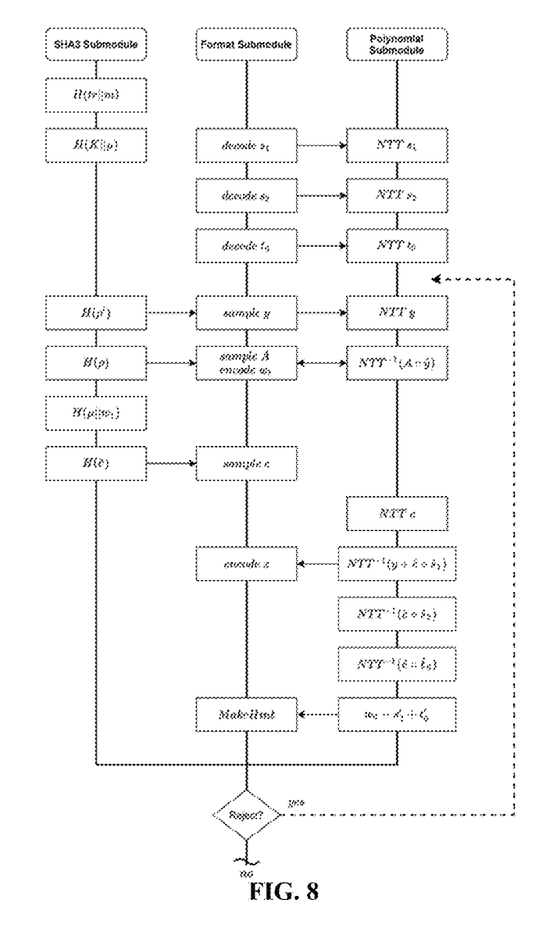
Figure 9:
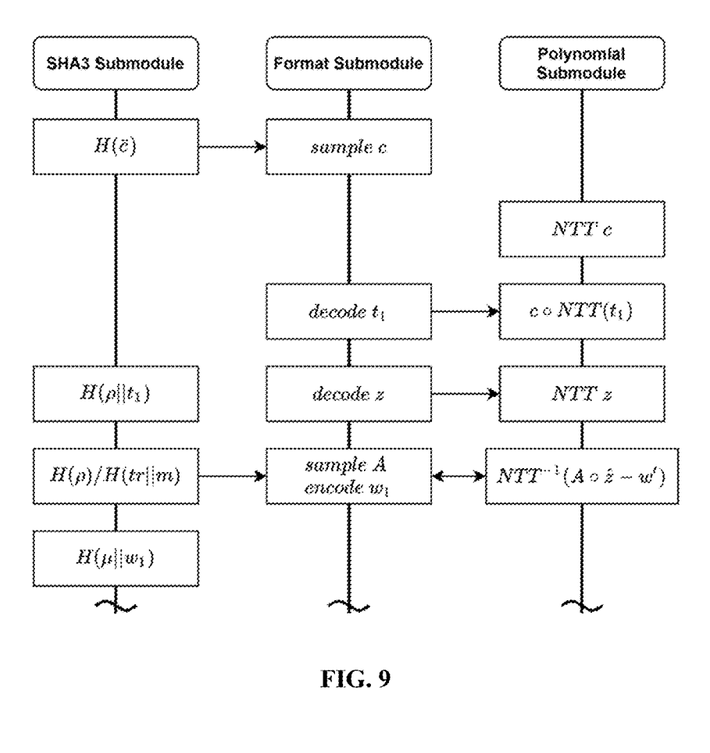
Figure 10:
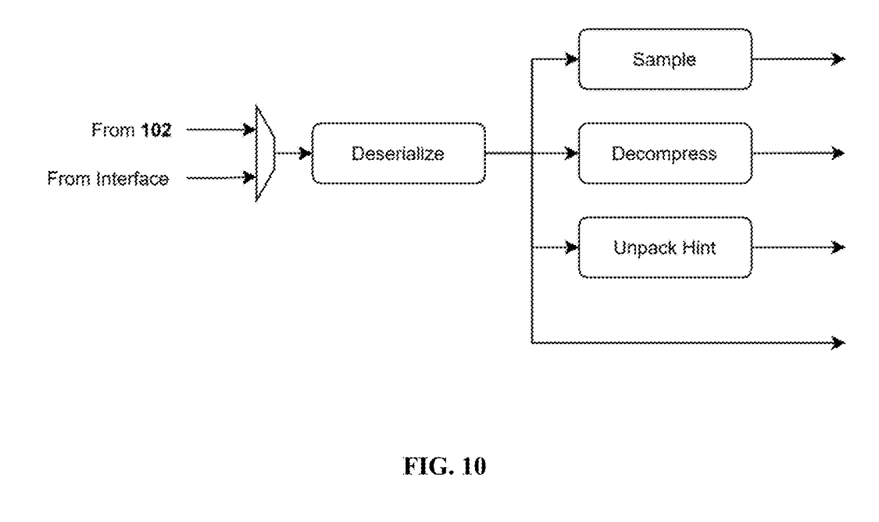
FIG. 10 is a block diagram showing the connection between deserialize, decompress, and hint unpacking in accordance with one embodiment of the present invention.

Still referring to FIG. 1, all operations not related to polynomial arithmetic or hashing may be performed by the submodules 103-109 that are preferably contained within the format submodule 114. With reference to FIG. 3, all sampling preferably utilizes a common interface to reduce resource utilization with a singular module being composed of a rejection sampling unit 300 for rejection sampling of polynomial coefficients for the public polynomials of Kyber-KEM and Dilithium-DSA, a centered binomial distribution sampling unit 302 for sampling of Kyber-KEM secret polynomial coefficients, and a uniform sampling unit 304 for Dilithium-DSA. The input data to these submodules 300, 302, 304 may optionally be transferred or otherwise utilized by the butterfly module 101 for encoding final results, the hash submodule 102 when sampling polynomials, or the system input when decoding algorithm inputs including keys, ciphertexts, and seed values. Submodules 106-108 may optionally utilize the shift register within deserialize submodule 105 to reduce area utilization of the system when decoding polynomial inputs or generating samples from the output of the hash submodule 102 as shown best in FIG. 10.

The sample C 104 may utilize the output of the hash function 102 to generate a challenge polynomial for the Dilithium-DSA primitives. The pack hint 109 and unpack hint 106 may each respectively decode and encode a hint polynomial for the Dilithium-DSA primitive. The decompression submodule 108 may perform a decompression operation for polynomials for the Kyber-KEM primitive. Outputs of the format submodule 114 may optionally be used as final outputs of the system or may be stored in the memory bank 110 as temporary results.

With reference back to FIG. 1, a memory bank 110 is utilized to store intermediate results of the computations for Kyber-KEM and Dilithium-DSA. Said memory bank 110 may be composed of one or multiple BRAM, SRAM, or other memory units. Said memory bank may optionally receive input from the butterfly submodule 101, the hash submodule 102, or the other submodules 103-108 depicted in FIG. 1. Specifically, a specialized hash submodule 102 is utilized for sampling and hashing as required in Kyber-KEM and Dilithium-DSA. In one embodiment, the hash module 102 is a SHA3 coprocessor composed of a Keccak permutation unit. The input to submodules, including the has module 102, may be fetched from a memory bank 110 (e.g., "MEM BANK"), and the output may optionally be stored back in the memory bank 110 as a temporary value, may be utilized by components/submodules 104, 105 within the format submodule 114, or may be sent to the data output 116 as a final value. The hash submodule 102 is also operably configured to perform hash operations and to generate pseudorandom numbers, wherein the hash submodule 102 is also configured to do hashing outside of pseudorandom number generation.

With reference to FIGS. 4-9, one possible set of flows of operations for said controller of the datapath exemplified in FIG. 1 is shown. In particular, FIG. 4 details exemplary flow of operations to accomplish the key generation algorithm of Kyber-KEM, FIG. 5 details exemplary flow of operations to accomplish the encapsulation algorithm of Kyber-KEM, FIG. 6 details exemplary flow of operations to accomplish the decapsulation algorithm of Kyber-KEM, FIG. 7 details exemplary flow of operations to accomplish the key generation algorithm of Dilithium-DSA, FIG. 8 details exemplary flow of operations to accomplish the signature generation algorithm of Dilithium-DSA, and FIG. 9 details exemplary flow of operations to accomplish the signature verification algorithm of Dilithium-DSA, wherein said flows of operation may be implemented by a controller to utilize the modules and submodules show in FIG. 1 to perform the algorithms of Kyber-KEM and Dilithium-DSA.

Although an exemplary system and method utilizing lattice-based key encapsulation and digital signature generation implemented in a co-processor on an electronic computing device has been described and shown, various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. An area efficient architecture for lattice-based key encapsulation and digital signature generation implemented as a co-processor on an electronic computing device and operably configured to perform a plurality of cryptographic algorithms for Dilithium-DSA at all defined post-quantum cryptography security levels and a plurality of cryptographic algorithms for Kyber-KEM at all defined post-quantum cryptography security levels and having:
    a co-processor:
        operably configured to process, with a polynomial arithmetic submodule, polynomial arithmetic and generate integer values representing polynomial coefficients using a singular butterfly unit that is part of the polynomial arithmetic submodule and operably configured to perform Karatsuba multiplication and accumulation, modular addition with optional compression, modular subtraction with optional compression, modular multiplication, a Cooley-Tukey butterfly operation, and a Gentlemen-Sande butterfly, to facilitate in the generation of the integer values representing polynomial coefficients;
        operably configured to perform, with a hash submodule, hash operations and to generate pseudorandom numbers;
        operably configured to encode polynomials, with a polynomial format submodule, and decode polynomials, with the polynomial format submodule, wherein the polynomial format submodule is communicatively coupled to the polynomial arithmetic submodule and the hash submodule;
    with a memory bank communicatively coupled with the hash submodule, the polynomial format submodule, and a data interface and operably configured to receive and store temporary values from the polynomial arithmetic submodule; and
    operably configured to manage, with a control unit, the data interface at selectively controlled time intervals and to utilize polynomial arithmetic submodule, the hash submodule, and the polynomial format submodule to perform the plurality of cryptographic algorithms for Dilithium-DSA and for Kyber-KEM with the temporary values.

2. The area efficient architecture according to claim 1, wherein the co-processor is operably configured to process, with a singular integer multiplier unit of the polynomial arithmetic submodule, the integer values representing polynomial coefficients for all operations utilizing modular multiplication, decomposition, and compression.

3. The area efficient architecture according to claim 1, wherein polynomial format submodule further comprises:
    a single shift register operably configured to be utilized by
        a coefficient sampling unit, a decompression unit, a hint unpacking unit, and a deserialization unit for decoding polynomials.

4. The area efficient architecture according to claim 1, wherein the coefficient sampling unit further comprises:
    a centered binomial sampling unit, a rejection sampling unit, and a uniform sampling unit utilized on a singular module and utilized with a common interface to reduce resource utilization and for sampling in Dilithium-DSA and in Kyber-KEM.

5. The area efficient architecture according to claim 1, wherein the co-processor is operably configured, with the polynomial format submodule, to unidirectionally communicate with the polynomial arithmetic submodule, the hash submodule, and the memory bank and bidirectionally communicate with the data interface.

* * * * *